Figure 1:
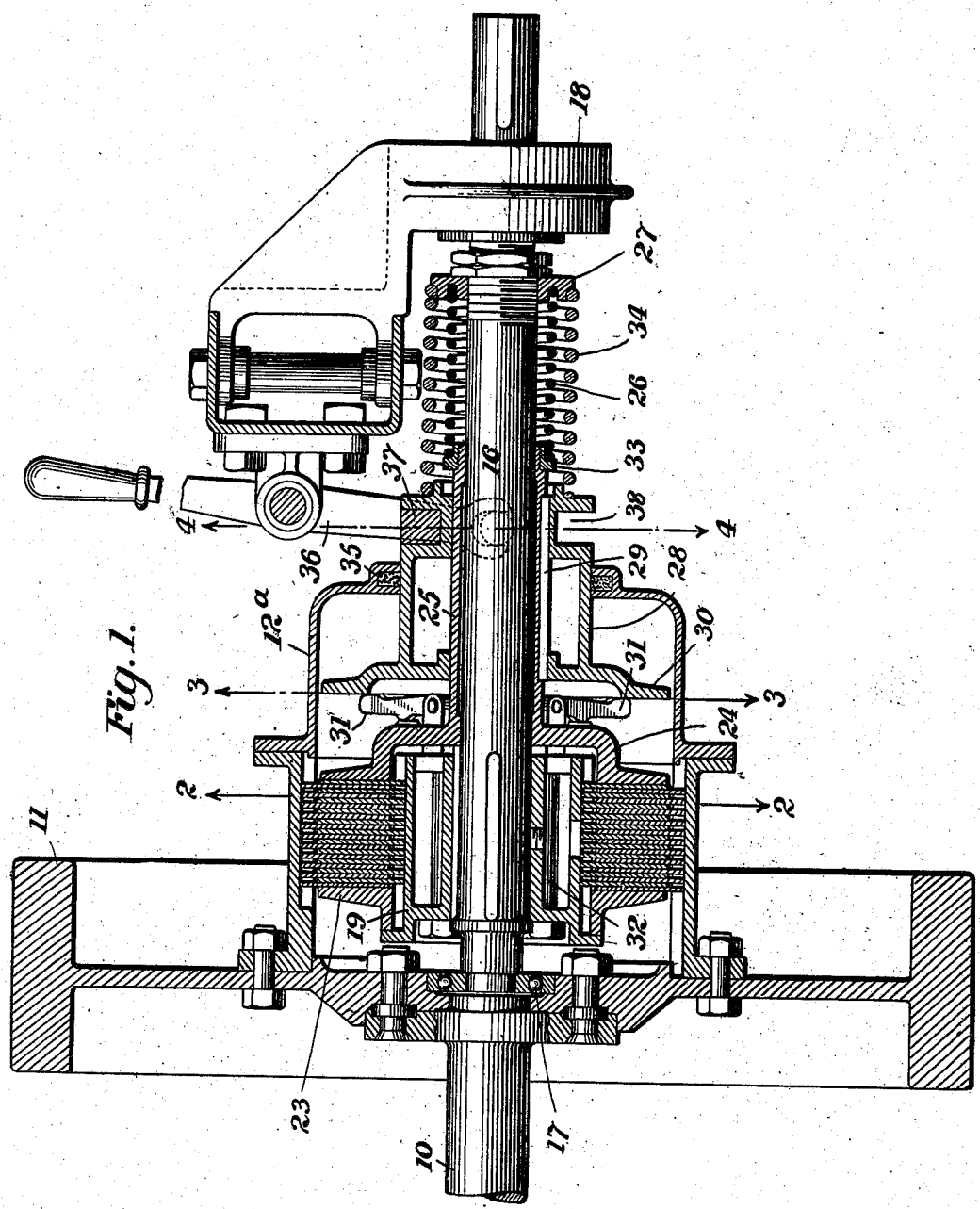

No. 840,626. PATENTED JAN. 8, 1907.
R. HUFF.
FRICTION CLUTCH.
APPLICATION FILED OCT. 19, 1906.
2 SHEETS—SHEET 2.
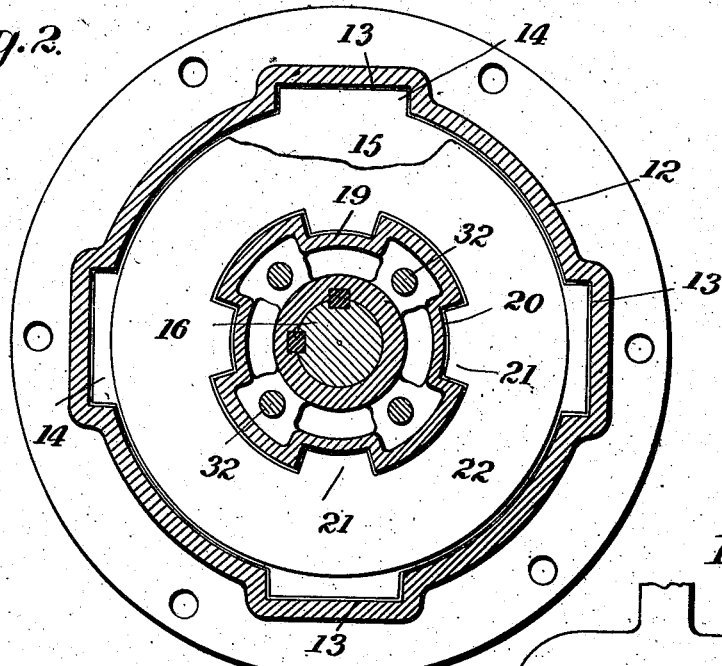
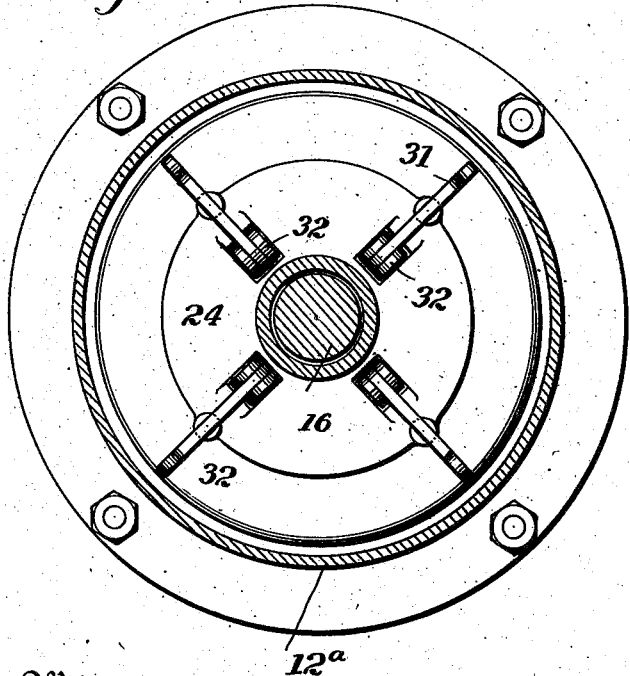
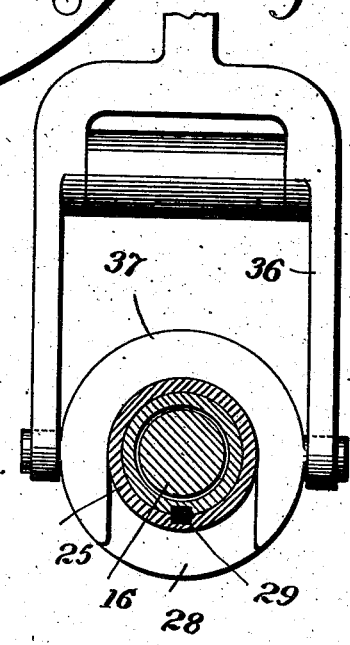

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF WEST VIRGINIA.

FRICTION-CLUTCH.

No. 840,626.  Specification of Letters Patent.  Patented Jan. 8, 1907.

Application filed October 19, 1906. Serial No. 339,663.

*To all whom it may concern:*

Be it known that I, RUSSELL HUFF, a citizen of the United States, and a resident of Detroit, Wayne county, State of Michigan, have invented certain new and useful Improvements in Friction-Clutches, of which the following is a specification.

In friction-clutches of the multiple-disk type, especially when used in motor-vehicles, it is desirable to apply pressure to the contacting clutch members gradually, permitting a relative slipping movement as the driven member is starting, and to eventually clamp the members together so tightly that they become positively engaged and rotate as a unit. In this manner the vehicle may be started slowly and gradually permitted to acquire speed until the limit of speed is reached.

The present invention relates to means for gradually applying pressure to the clutch members of a friction-clutch. In such clutches, and especially in clutches of the multiple-disk type, it has been customary heretofore to apply pressure to the clutch members by means of a spring, and in order that there may be no slip when the clutch is fully applied a very strong spring has been required. With such a spring there is danger of applying the power too suddenly and starting the mechanism with a jerk, thereby straining the parts.

According to the present invention two springs are used, the one being adapted to apply a preliminary pressure to the clutch to start the vehicle or other mechanism gradually and the other being adapted to come into play later and connect the clutch members forcibly and prevent relative slipping of said members.

The invention will be described in connection with the accompanying drawings, in which—

Figure 1 is a central sectional view of a clutch embodying the invention. Fig. 2 is a section on the line 2 of Fig. 1. Fig. 3 is a section on the line 3 of Fig. 1, and Fig. 4 is a section on the line 4 of Fig. 1.

Referring to the drawings, 10 indicates the driving-shaft—which, for instance, may be the crank-shaft of a hydrocarbon-engine adapted for driving a motor-vehicle. 11 indicates a fly-wheel rigidly connected to said shaft.

12 indicates a clutch-casing of substantially cylindrical form rigidly connected with the fly-wheel, and 12ª an extension of said casing. As shown in Figs. 1 and 2, the outer casing 12 is provided with internal longitudinal recesses 13, into which fit lugs 14 of a series of disks 15, arranged within the casing.

In line with the driving-shaft 10 is a driven shaft 16, having one end mounted in a bearing 17 in the fly-wheel 11. The driven shaft is also provided with a suitable bearing 18, adjacent to the clutch mechanism. Rigidly connected with the driven shaft near its inner end is a clutch-hub 19, having on its outer surface a series of longitudinal recesses or grooves 20, adapted to receive the lugs 21 of a series of clutch-disks 22. The clutch-disks 22 are arranged alternately with the clutch-disks 15, the former rotating with the clutch-hub 19, while the latter rotate with the clutch-casing 12 and the driving-shaft 10. The two series of disks are arranged between a collar 23, fixed on the hub 19, and a circular flange-like head 24 on a sleeve 25, which is adapted to slide on and turn with the driven shaft 16. The sleeve 25 is normally pressed toward the clutch members 15 22 by a coiled spring 26, which is interposed between the sleeve 25 and a collar 27, fixed on the shaft 16.

An outer sleeve 28 is arranged to slide on and turn with the inner sleeve 25 and being connected to said sleeve by a spline or key 29. The outer sleeve 28 is provided with a circular flange-like head 30, and between the heads 30 and 24 are a series of radially-arranged levers 31, having their inner ends pivoted to bolts 32, which are fixed in the hub 19 and pass through openings in the head 24, causing said head to rotate with the hub and with the shaft 16. The head 30 is arranged to bear on the outer ends of the levers 31, while the middle portions of said levers bear on the head 24, thus transmitting movement from the head 30 to the head 24. The inner sleeve 25 is provided at its end with a flange 33, against one side of which the spring 26 bears. The outer sleeve 28 contacts with the other side of the flange 33 in opening the clutch, as will be hereinafter explained. Between the sleeve 28 and the fixed collar 27 is a second coil-spring 34, surrounding the spring 26. The sleeve 28 is cylindrical on its outer surface and closely fits the opening in the extension 12ª of the clutch-casing, a packing of felt 35 being used between the parts to make the joint oil-tight. The casing is usually partially filled with oil to lubricate the parts of the clutch. The clutch may be operated by means of a lever 36, which engages trunnions of a yoke 37, running in an external groove 38 in the outer sleeve 28. The lever 36 may be operated by hand or foot power, as desired.

The operation of the clutch is as follows: As previously stated, the outer clutch-disks 15, which may be termed the "primary" clutch-disks, rotate with the driving-shaft 10. When the clutch is open, the inner clutch member comprising the secondary clutch-disks 22 is stationary. As the lever 36 is moved to permit the springs to act the head 24 of the inner sleeve is first pressed against the clutch-disks by the spring 26, which is preferably weaker than the spring 34. The head 30 of the outer sleeve does not begin to bear upon the levers 31 until after the full pressure of the spring 26 is transmitted through the head 24 to the clutch disks or members. The spring 34 then begins to act through the outer sleeve and the head 30 upon the levers 31, and when the operating-lever 36 is fully released the full pressure of both springs acts upon the clutch, the spring 26 acting directly upon the head 24, while the spring 34 acts through the head 30 and the levers 31 upon the head 24. In opening the clutch the pressure of the outer spring 34 is first removed and later the pressure of the inner spring 26. The inner spring is preferably lighter than the outer spring, and pressure on the clutch is thus applied at first gently and later with great force. This clutch is especially valuable in transmitting the movement of a hydrocarbon-engine to the driving-wheels in a motor-vehicle, as it facilitates starting the vehicle gently and gradually increasing the pressure of the clutch until the clutch members are practically locked together and moved as a unit. While the pressure of the lighter spring 26 is applied to the clutch the clutch members slip relatively, the driven member gradually acquiring the speed of the driving member, and the vehicle is thus started gently and gradually.

Having described my invention, what I claim, and desire to secure by Letters Patent, is—

1. In a clutch mechanism, the combination with a driving-shaft and a friction-clutch member driven thereby, of a driven shaft, a friction-clutch member connected with said driven shaft, two springs arranged to press said clutch members together, and means for applying said springs successively to close the clutch, for the purpose set forth.

2. In a clutch mechanism, the combination with a driving-shaft and a friction-clutch member driven thereby, of a driven shaft, a friction-clutch member connected with said driven shaft, two springs arranged to press said clutch members together, and means for successively removing the pressure of said springs from the clutch members.

3. In a clutch mechanism, the combination of a driving-shaft and a primary friction-clutch member connected to rotate with said shaft, of a driven shaft, a secondary friction-clutch member connected to rotate with the driven shaft, a head or clamp for pressing said clutch members together, two springs adapted to bear upon said head of clamp, and means for successively throwing said springs into operation whereby the combined pressure of the springs is gradually applied to the clutch.

4. In a clutch mechanism, the combination of a driving-shaft and a primary friction-clutch member comprising a series of disks connected to rotate with said shaft, a driven shaft, a secondary friction-clutch member comprising a series of disks connected to rotate with the driven shaft, a head or clamp for pressing said clutch members together, two springs adapted to bear upon said head or clamp, and means for successively throwing said springs into operation whereby the combined pressure of the springs is gradually applied to the clutch.

5. In a clutch mechanism, the combination with driving and driven shafts, of the two series of friction-disks connected respectively to said shafts, the sleeve on the driven shaft having a head bearing on said disks, the spring adapted to bear on said sleeve, the outer sleeve, a second spring adapted to bear on the outer sleeve, and means for transmitting the pressure of the outer sleeve to the head of the inner sleeve, for the purpose set forth.

6. In a clutch mechanism, the combination with driving and driven shafts, of the two series of friction-disks connected respectively to said shafts, the sleeve on the driven shaft having a head bearing on said disks, the spring adapted to bear on said sleeve, the outer sleeve, a second spring adapted to bear on the outer sleeve, a head on said outer sleeve, and a series of levers arranged between the head of the outer sleeve and the head of the inner sleeve, for the purpose set forth.

7. The combination with the motor or driving shaft, of the driven shaft coaxial with the driving-shaft and having a bearing at the end of the driving-shaft, a clutch-casing connected with the driving-shaft and carrying a series of clutch-disks, a clutch-hub upon the driven shaft and carrying an alternate series of clutch-disks, an inner sleeve adapted to slide on the driven shaft and having a head adapted to clamp the clutch-disks together, an outer sleeve adapted to slide upon the inner sleeve and turn therewith, a head upon the outer sleeve, a series of levers interposed between the heads of said sleeves, two springs bearing respectively on said sleeves and adapted to move them toward the clutch-disks, and means for applying said springs successively to clamp said clutch-disks and for relieving said clutch-disks successively of the pressure of said springs, for the purpose set forth.

In testimony whereof I affix my signature in presence of two witnesses.

RUSSELL HUFF.

Witnesses:
ALLEN LOOMIS,
R. H. ALLEN.